(12) United States Patent
Long et al.

(10) Patent No.: US 7,102,328 B2
(45) Date of Patent: Sep. 5, 2006

(54) CHARGING STAND HAVING OPEN AND CLOSED POSITIONS

(75) Inventors: Jason Long, Morrison, IL (US);
Charles Hartwig, Dixon, IL (US)

(73) Assignee: Wahl Clipper Corporation, Sterling, IL (US)

( * ) Notice: Subject to any disclaimer, the term of this patent is extended or adjusted under 35 U.S.C. 154(b) by 160 days.

(21) Appl. No.: 10/614,668

(22) Filed: Jul. 7, 2003

(65) Prior Publication Data
US 2005/0007066 A1    Jan. 13, 2005

(51) Int. Cl.
*H01M 10/46* (2006.01)
(52) U.S. Cl. .................................... 320/115
(58) Field of Classification Search ............ 320/107, 320/113, 114, 115
See application file for complete search history.

(56) References Cited

U.S. PATENT DOCUMENTS

| | | | |
|---|---|---|---|
| 3,287,076 A * | 11/1966 | Spoffard | 312/206 |
| 3,371,260 A * | 2/1968 | Jackson et al. | 320/115 |
| 3,389,323 A * | 6/1968 | Jepson et al. | 320/115 |
| 3,463,994 A * | 8/1969 | Spohr | 320/115 |
| D360,485 S | 7/1995 | Simonelli | D28/73 |
| 5,982,884 A | 11/1999 | Hoffmann | |
| D426,676 S | 6/2000 | Bushman | D28/73 |
| 6,127,802 A * | 10/2000 | Lloyd et al. | 320/113 |
| D435,938 S | 1/2001 | Bushman | D28/73 |
| D465,304 S | 11/2002 | Bushman | D28/73 |
| D469,221 S | 1/2003 | Cozzolino et al. | D28/73 |

FOREIGN PATENT DOCUMENTS

EP  1 282 212 A2   2/2003

* cited by examiner

*Primary Examiner*—Edward H. Tso
(74) *Attorney, Agent, or Firm*—Greer, Burns & Crain, Ltd.

(57) ABSTRACT

A charging stand for selectively enclosing and exposing an appliance such as a hair trimmer having a rechargeable battery includes a base and a cover. The base has an access opening for supporting the appliance, and electrical contacts for charging the battery. The cover fits over the base to define an interior space for enclosing the appliance, and can be secured to the base in at least two positions. In a first position, the cover encloses the appliance with the base. In the second position, the cover exposes the appliance when the appliance is in a raised position.

10 Claims, 4 Drawing Sheets

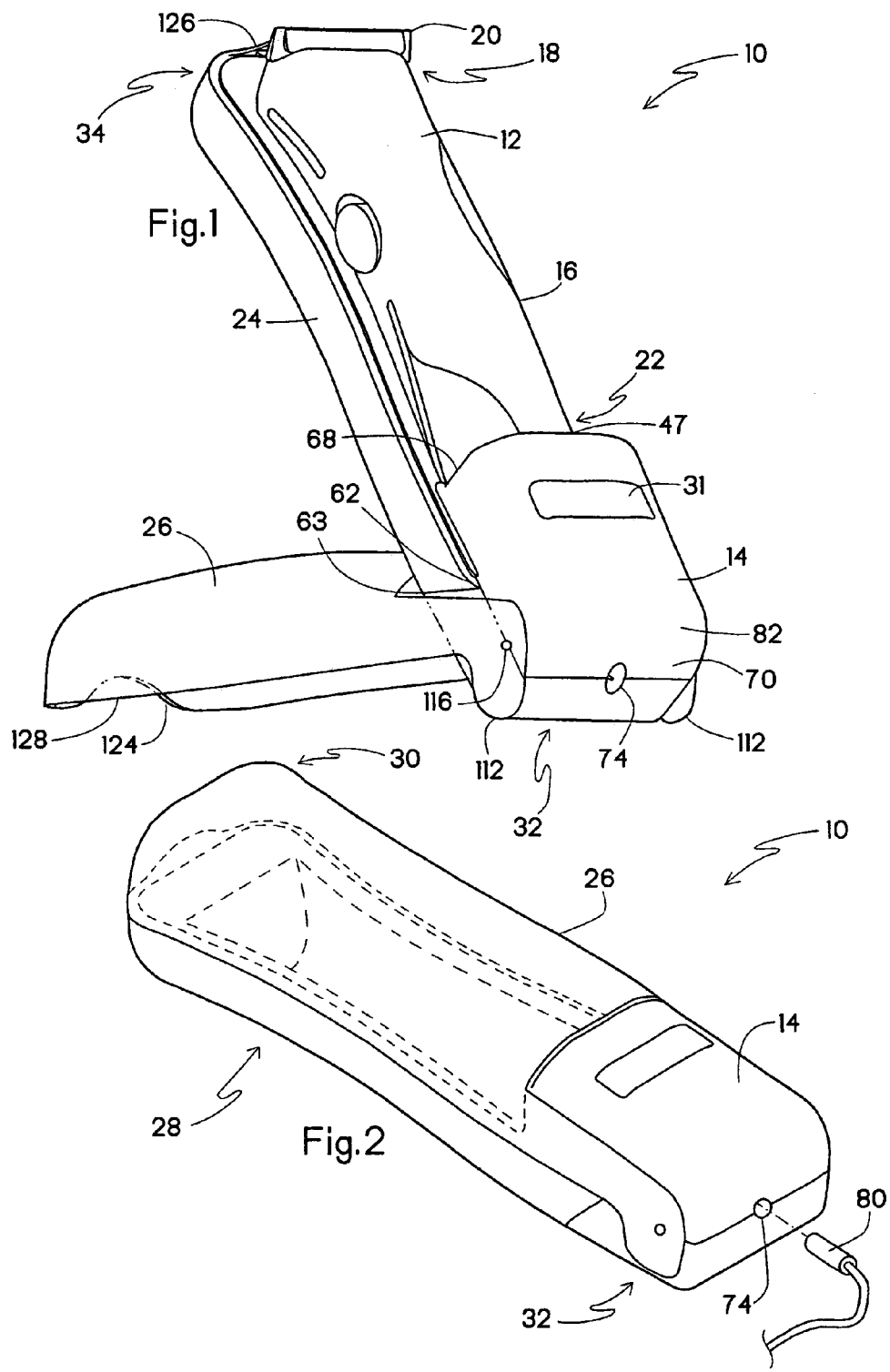

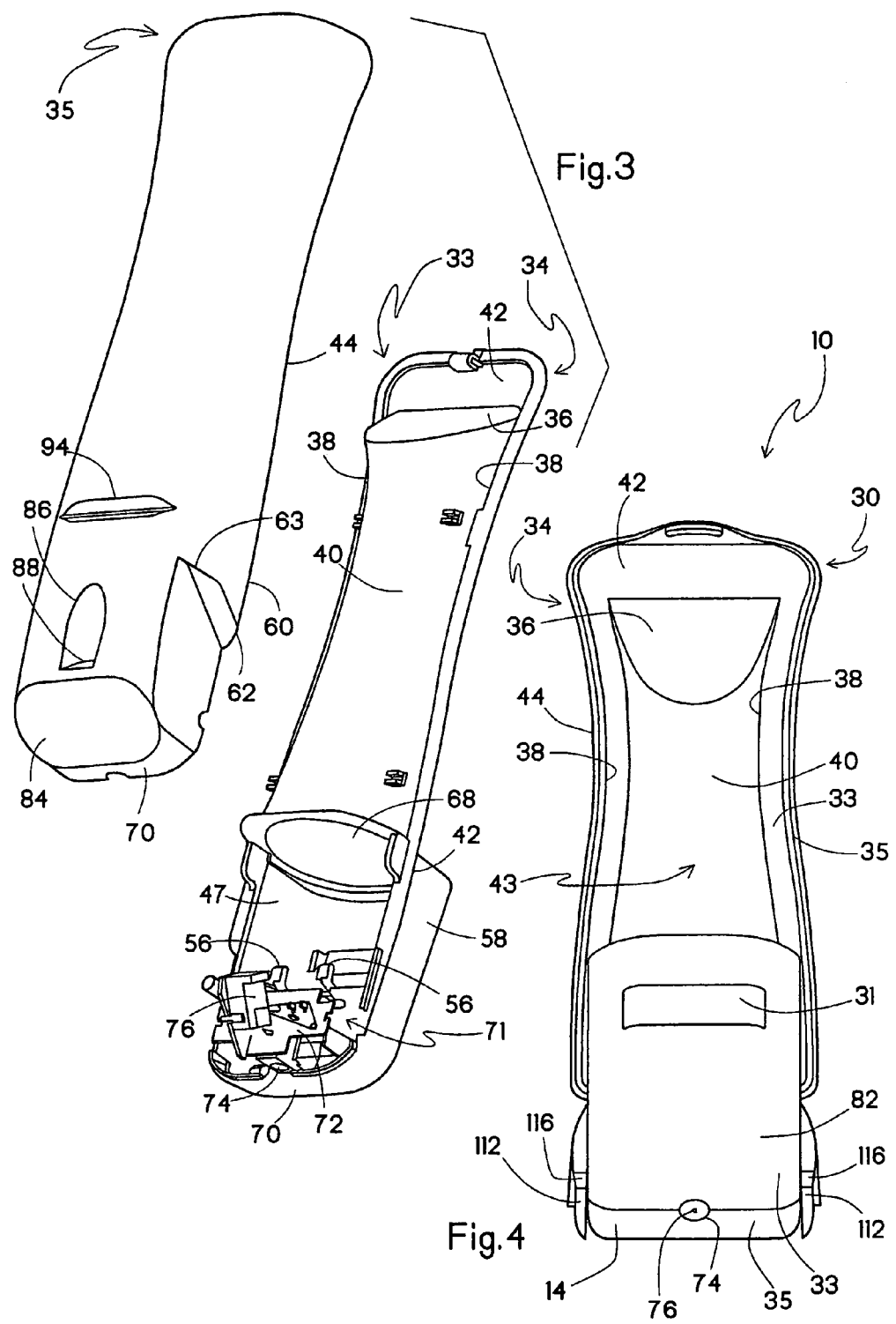

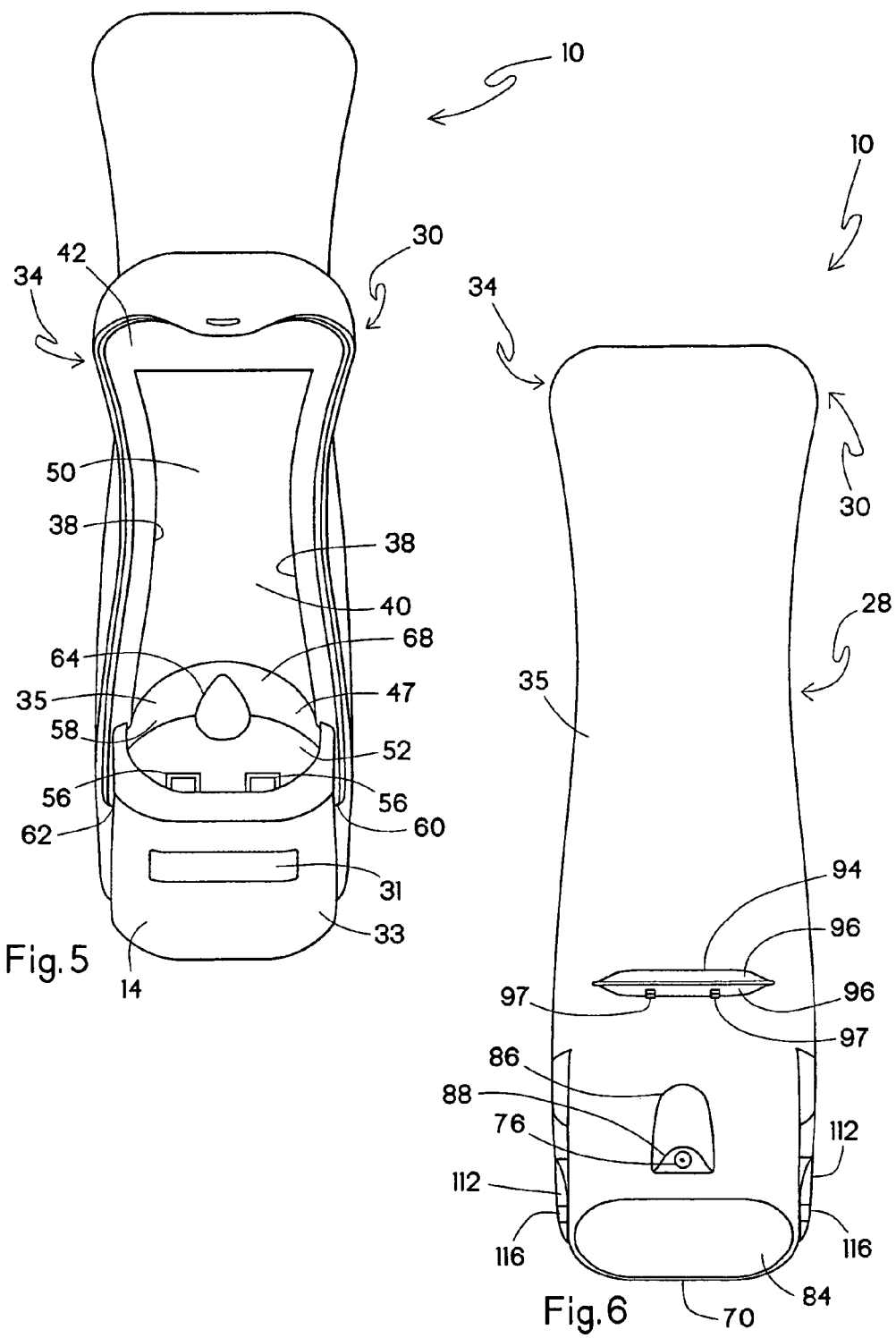

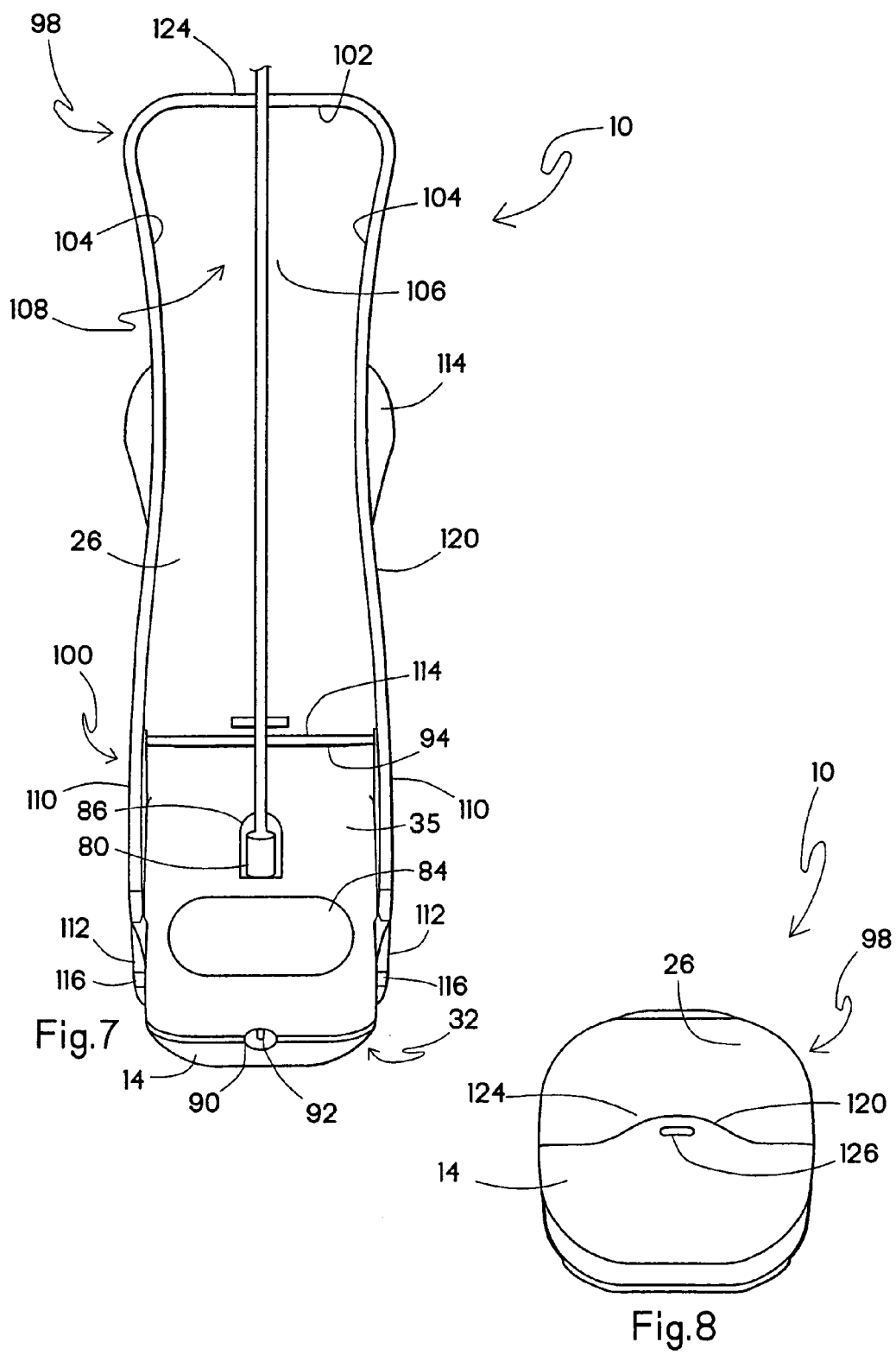

CHARGING STAND HAVING OPEN AND CLOSED POSITIONS

This invention relates to charging stands, and more particularly, to charging stands having a cover that can be closed for storage of a rechargeable appliance such as a hair trimmer, beard trimmer or the like, or opened and set on a table with the appliance in a raised position.

BACKGROUND OF THE INVENTION.

Charging stands have been used for storing rechargeable hair trimmers and other appliances and charging their internal batteries. The charging stand typically has a base and a cradle. The stand supports the hair trimmer in an inclined position. Power is provided through contacts in the charging stand, which in turn receives power through a power cord that is routed under or behind the base of the charging stand.

When traveling, the stand must be taken to charge the clipper, but the stand is bulky and awkward to pack, and the clipper is typically packed separately, usually uncovered. Thus, there is a need for compact charging stands that can be conveniently packed in luggage. There is also a need for storage devices for appliances such as hair trimmers and other rechargeable personal care items.

SUMMARY OF THE INVENTION

In keeping with one aspect of the invention, a charging stand for selectively enclosing and exposing an appliance such as a hair trimmer having a rechargeable battery includes a base and a cover. The base has an access opening for supporting the appliance, and electrical contacts for charging the battery. The cover fits over the base to define an interior space for enclosing the appliance, and can be secured to the base in at least two positions. In a first position, the cover encloses the appliance with the base. In the second position, the cover exposes the appliance when the appliance is in a raised position.

BRIEF DESCRIPTION OF THE DRAWINGS

FIG. 1 is a perspective view of a charging stand of the present invention in an open position, with a rechargeable hair trimmer in the charging stand;

FIG. 2 is a perspective view of the charging stand of FIG. 1, in a closed position;

FIG. 3 is an exploded view of the base of the charging stand of FIG. 1;

FIG. 4 is a front elevation view of the charging stand of FIG. 1, in the open position;

FIG. 5 is a top view of the charging stand of FIG. 1, in the open position;

FIG. 6 is a back view of the charging stand of FIG. 1, in the closed position;

FIG. 7 is a bottom view of the charging stand of FIG. 1, in the open position; and FIG. 8 is a top view of the charging stand of FIG. 1, in the closed position.

DETAILED DESCRIPTION OF PREFERRED EMBODIMENT

Referring now to FIGS. 1–4, a charging stand 10 holds a portable rechargeable appliance 12 in a base 14 for storage and recharging purposes. The rechargeable appliance 12 is shown as a hair trimmer, but the present invention is contemplated as being utilized with other rechargeable electric devices or appliances including shavers, clippers or the like, using rechargeable batteries and recharging bases or stands. Alternatively, the stand 10 may hold an appliance that does not have rechargeable batteries or require recharging on the stand.

The rechargeable unit 12 includes a housing 16 with a working end 18 which, as illustrated, is equipped with a bladeset 20. On the opposite end of the housing 16 from the working end 18 is a charging end 22. The charging end 22 may have a pair of contacts (not shown) for charging an internal rechargeable battery or batteries.

The charging stand 10 includes a cover 26 for supporting the base 14 upon a substrate such as a table, countertop or shelf when the charging stand is in a fully open position, as in FIG. 1. As seen in FIG. 2, the base 14 and the cover 26 can also be arranged in a closed position. In the closed configuration, the charging stand 10 is generally cylindrical with a narrow central region 28, a rounded top region 30 and a rounded bottom region 32.

The base 14 has essentially the same configuration as the cover 26, so that the cover fits on the base when the cover 26 is closed to form a case. The base 14 and cover 26 may be plastic or any other suitable material, and may be opaque, or clear for viewing the rechargeable unit 12 through the storage unit 10.

Referring now to FIGS. 3 and 4, the base 14 has a front piece 33 that rests inside a rear piece 35. The front piece 33 has an upper end 34 including a top wall 36, opposed side walls 38 and a rear wall 40 defining a base interior space 43. As illustrated, the opposed side walls 38 and the rear wall 40 form a unitary curved surface corresponding to the curvature of the unit 12. However, the present invention also contemplates separate and distinct walls which accommodate the unit 12. Top wall 36 is inclined with respect to the longitudinal axis of the charging stand 10, to accommodate the blades of the hair trimmer, and is located in the rounded top region 30 between the opposed side walls 38 and above the rear wall 40.

A panel 42 is also disposed on the rounded top region 30 of the front piece 33 above the top wall 36 and extends along two sides of the base interior space 43, outwardly disposed from the side walls 38. The rear piece 35 has an edge 44 adjacent to the side panel 42, and a lateral detent (not shown) which is continuous around the side panel. The side panel 42 fits inside the edge 44.

The base 14 defines a docking recess 47 for receiving the rechargeable appliance 12. The front of the recess 47 is formed by the front piece 33, and the back of the recess 47 is formed by the rear piece 35. The front of the recess 47 may have a graphics area 31 for brand identification or other indicia.

As seen in FIG. 5, the upper end 34 of the base 14 supports the rechargeable unit 12 (not shown in FIG. 5) when docked in the recess 47. A floor 52 which is provided with at least one and generally two contacts 56 is disposed at the bottom of the docking recess 47.

Typically, there are two contacts on each of the rechargeable unit 12 (contacts not shown) and the base 14 which are located in adjacent relationship to each other. While the preferred embodiment has two contacts 56, it is contemplated that the number and positioning of the contacts may vary to suit the application, such as a personal digital assistant or other digital device, provided there is at least one contact 56 constructed and arranged for making physical and electrical contact with a contact on the rechargeable unit 12. Recharging is achieved by the electrical connection between the rechargeable unit 12 contacts and the base 14 contacts, and the connection is typically maintained through the physical engagement of the corresponding metallic contacts on both the unit and the base.

The contacts 56 may be configured for causing an enhanced, more consistent wiping contact action between the contacts on the rechargeable unit 12 and the contacts 56 on the base 14. In the preferred embodiment, the wiping engagement is created by the contacts 56 forming an inclined surface above the floor 52, defining an inverted "U" shape. It is also contemplated that the contacts 56 need not project through the floor 52, but may be flush or recessed, depending on the configuration of the contacts on the rechargeable unit 12.

Also included in the docking recess 47 is a curved wall 58 which follows the curvature of the housing 16 of the rechargeable unit 12. The docking recess 47 forms a receptacle for the charging end 22 and the curved wall 58 extends upwardly a length suitable to maintain the rechargeable unit 12 in the recess. Extending over the outer periphery of the curved wall 58 at each side of the docking recess 47 is the side panel 42. The side panel 42 is molded to the front part that forms the recess 47, to form the front piece 33. Ends 60 of side walls 38 are angled such that the edge portions 62 of the side walls are further from the top region 30 than the back-side portion 63 (best seen in FIG. 1).

For inserting and removing the rechargeable unit 12, an access opening 68 is defined by the curved wall 58 and walls 36, 38 and 40 of the base 14. During insertion of the rechargeable unit 12 into the base 14, as illustrated in FIG. 1, the charging end 22 is received in the access opening 68 of the docking recess 47 and is removably coupled to the base by sliding the housing 16 until the trimmer 12 engages the floor 52. An electrical connection results as the contacts on the rechargeable trimmer 12 touch the contacts 56.

Referring now to FIGS. 1–6, the base 14 includes a bottom 70 which is generally perpendicular to the longitudinal axis of the base, and forms an enclosure 71 (shown in FIG. 3) between the bottom 70 and the floor 52 of the docking recess 47. The enclosure houses the contacts 56 which protrude through the floor 52, two female sockets 74 and 76, and a printed circuit board 72 or the like that connects the contacts and sockets so that a male connector of a power supply can be inserted in either socket 74 or 76. In the preferred embodiment, when the charging stand 10 is in a closed position and laying on the rear piece 35 of the base, as in FIG. 2, power can be delivered to the rechargeable unit 12 through a power cord 80 inserted into the socket 74.

A rounded side 82 and an angled side 84 are located on either side of the bottom 70, the angled side having a generally oval shape and forming a generally 45-degree angle with the bottom. Located above the angled side 84 on the rear piece 35 of the base 14 is an inclined recess 86 for the socket 76. The recess 86 has a bottom 88 inclined perpendicular to the direction of inclination of the recess. Centrally disposed on the recess bottom 88 is the socket 76, configured to receive the male end of the cord 80 when the charging stand. 10 is in an open position, or when the socket 74 is otherwise inaccessible (best seen in FIG. 7).

Above the inclined recess 86 is an elongated groove 94 which generally forms a "V" in profile. Two opposing groove sides 96 are disposed laterally across the rear piece 35 of the base 14. Due to the generally rounded shape of the base 14, the depth of the groove 94 from the surface of the rear piece 35 is greatest at the center and tapers towards the sides of the groove. Located on one of the groove sides 96 are two protrusions 97. The groove 94 and the protrusions 97 are configured to engage the cover 26 when the charging stand 10 is in the fully open position.

Referring now to FIG. 7, the cover 26 is generally half cylindrical and hollow, having an upper end 98 and a lower end 100. The upper end 98 includes a top wall 102, opposed side walls 104, and a rear wall 106 defining a cover interior space 108. As illustrated, the top wall 102, the opposed side walls 104 and the rear wall 106 form a unitary, curved surface corresponding to the curvature of the unit 12. However, the present invention also contemplates separate and distinct walls which accommodate the unit 12.

Located at the lower end 100 of the cover 26 are two legs 110 longitudinally aligned with the upper end 98 of the cover 26. Two feet 112 are disposed at the end of legs 110 on both sides of a groove receiving edge 114 and are pivotably engaged with the base 14 at the bottom region 32. The feet 112 have a generally perpendicular alignment with the legs 110 (best seen in FIG. 1) and have an outside width not extending beyond the widest part of the charging stand 10. A pivot point 116 is generally located in the bottom region 32.

As seen in FIG. 8, the cover 26 has a peripheral edge 120 along an upper end 98 which is suitable for mating with the base 14 when the stand is closed. At the upper end 98, the top wall 102 is curved outwardly away from the base 14 at a central curve 124 and the base has a suitable latch 126. Mating of the top wall 102 and the upper end 34 of the base 14 at the latch 126 helps retain the cover 26 and the base in a substantially closed position during shipment or storage.

In order to convert the charging stand 10 to an open position, the cover 26 and the base 14 are first separated by releasing the latch 126. Once separated, the cover 26 is pivoted beneath the base 14 approximately 315 degrees until the groove receiving edge 114 of the cover 26 engages the groove 94. The base 14 is supported by the cover 26 at the groove receiving edge 114 and the access opening 68 of base 14 is exposed for inserting or removing the rechargeable unit 12.

In this fully open position, the base 14 and the cover 26 form approximately a 45-degree angle, although an upright position or any angle of inclination suitable for retaining the rechargeable unit 12 within the base 14 is contemplated. The angled side 84 of the bottom 70 is angled such that when the groove receiving edge 114 engages the groove 94, the angled side lays flat on the table or other substrate. Also contacting the table and supporting the base 14 are the feet 112, now normal to the substrate, and the top wall 102 of the cover 26. The central curve 124 of the cover 26, however, does not contact the table, as seen in FIG. 1, but forms an opening 128 with the substrate in which the power cord 80 can be fed to the socket 76. As a result, power can be delivered to the rechargeable unit 12 while the storage unit 10 is in any open position.

While particular embodiments of the charging stand have been shown and described, it will be appreciated by those skilled in the art that changes and modifications may be made thereto without departing from the invention in its broader aspects and as set forth in the following claims.

We claim:

1. A charging stand for charging and selectively enclosing and exposing an appliance having a rechargeable battery, the battery being charged by an external power source, comprising:

a base having a docking recess for receiving and supporting the appliance, said base having electrical contacts in communication with said recess for charging the battery and at least one socket for supplying power from the external power source to the contacts, said docking recess defining a pocket surrounding a lower portion of the appliance upon insertion of the appliance into said pocket;

a cover configured to fit over said base to define, with said recess, an interior space for enclosing the appliance; and means for securing said cover to said base in at least two positions such that in a first, closed position said cover encloses the appliance with said base and in a second, open position said cover exposes the appliance;

wherein said cover supports said base in said second, open position while said cover remains attached to said base;

wherein said base includes a latch which releasably secures said base and said cover together, and a groove on a surface of said base opposite from said recess for receiving an edge of said cover for supporting said base in said second, open position.

2. The charging stand of claim 1 wherein said means for securing includes:

a pivot point disposed on said base such that said cover can rotate around said pivot point between a closed position in which said cover covers said base and encloses the appliance, and an open position in which said cover supports said base in a raised position and exposes the appliance.

3. The charging stand of claim 1 wherein said cover has feet that straddle said base.

4. The charging stand of claim 3 wherein said feet are configured so that when said cover is in said second position, said feet are generally coextensive with a corresponding end of said base.

5. The charging stand of claim 1 wherein said base has an upper end and said latch is disposed on said upper end, said cover has an upper end and is configured at said upper end for receiving said latch.

6. A charging stand for charging and selectively enclosing and exposing an appliance having a rechargeable battery, the battery being charged by an external power source, comprising:

a base having a docking recess for receiving and supporting the appliance, said base having electrical contacts in communication with said recess for charging the battery and at least one socket for supplying power from the external power source to the contacts, said docking recess defining a pocket configured for surrounding a lower portion of the appliance upon insertion of the appliance into said pocket, said pocket securing the appliance in said base and maintaining a connection with said electrical contacts for recharging said battery;

a cover configured to fit over said base to define, within said recess, an interior space for enclosing the appliance;

means for securing said cover to said base in at least two positions such that in a first, closed position said cover encloses the appliance with said base and in a second, open position said cover exposes the appliance when the appliance is in a raised position;

said means for securing said cover to said base comprises a pivot point disposed on said base such that said cover can rotate around said pivot point between said first, closed position in which said cover covers said base and encloses the appliance, and said second, open position in which said cover supports said base in a raised position and exposes the appliance;

said base including a latch which releasably secures said base and said cover together, and a generally transverse groove on a surface of said base opposite from said recess for receiving an edge of said cover to support said cover in said second, open position.

7. The charging stand of claim 6 wherein said base includes a first socket and a second socket.

8. The charging stand of claim 7 wherein said first socket is disposed on a bottom surface of said base, and said second socket is disposed on a back surface of said base.

9. The charging stand of claim 6 wherein in said open position, said cover contacts a substrate and forms at least one opening with the substrate for feeding a cord to said base.

10. The charging stand of claim 9 wherein said at least one opening is at a top surface of said cover.

* * * * *